United States Patent
Eipe et al.

(10) Patent No.: US 8,687,556 B2
(45) Date of Patent: Apr. 1, 2014

(54) METHOD FOR CORRELATING CONNECTION INFORMATION WITH MOBILE DEVICE IDENTITY

(75) Inventors: Jacob Eipe, Nashua, NH (US); Mruthyunjaya Navali, Westford, MA (US); Vinod Kamalaraj, Shirley, MA (US); Manu Pathak, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 13/299,633

(22) Filed: Nov. 18, 2011

(65) Prior Publication Data

US 2013/0128873 A1    May 23, 2013

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| 7,653,056 | B1 * | 1/2010 | Dianes et al. | 370/389 |
| 2011/0116477 | A1 * | 5/2011 | Wu | 370/331 |
| 2011/0299501 | A1 * | 12/2011 | Keller et al. | 370/331 |
| 2012/0129525 | A1 * | 5/2012 | Pazhyannur et al. | 455/436 |

FOREIGN PATENT DOCUMENTS

CN    PCT/CN10/072431    *    2/2011

OTHER PUBLICATIONS

3GPP Technical Specifications, Sep. 2011, Version 10.3.0.*
3GPP Technical Specifications, Sep. 2011, Version 10.5.0.*

* cited by examiner

*Primary Examiner* — Otis L Thompson, Jr.
(74) *Attorney, Agent, or Firm* — Wilmer Cutler Pickering Hale and Dorr LLP

(57) ABSTRACT

A method comprising establishing a first control connection between a home node and a home node gateway having a first control connection identity, establishing a second control connection between the home node gateway and a mobility management device having a second control connection identity, communicating network traffic sent between the home node and the mobility management device on behalf of a mobile device using the first control connection and the second control connection, receiving a mobile device identifier included in a control message sent from the mobility management device using the second control connection in response to an entity type indication sent to the mobility management device from the home node gateway, the mobile device identifier uniquely identifying the mobile device, and correlating the mobile device identifier with a context including the first control connection identity and the second control connection identity.

17 Claims, 10 Drawing Sheets

US 8,687,556 B2

METHOD FOR CORRELATING CONNECTION INFORMATION WITH MOBILE DEVICE IDENTITY

FIELD OF THE DISCLOSURE

The present disclosure relates generally to a method and system for correlating mobile device identities with information related to those mobile devices in a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance, and a femto cell transceiver can provide coverage over a 50-200 meter distance. A femto cell transceiver is similar in coverage to a WiFi (WLAN) access point and can be used to provide network access over a short range. Home nodes, often containing femto cell transceivers, are typically deployed in homes and businesses to provide supplemental network access when the range or positions of the other wireless communication technology of a network is inadequate.

DESCRIPTION OF EXAMPLE EMBODIMENTS

Overview

Figure 1:
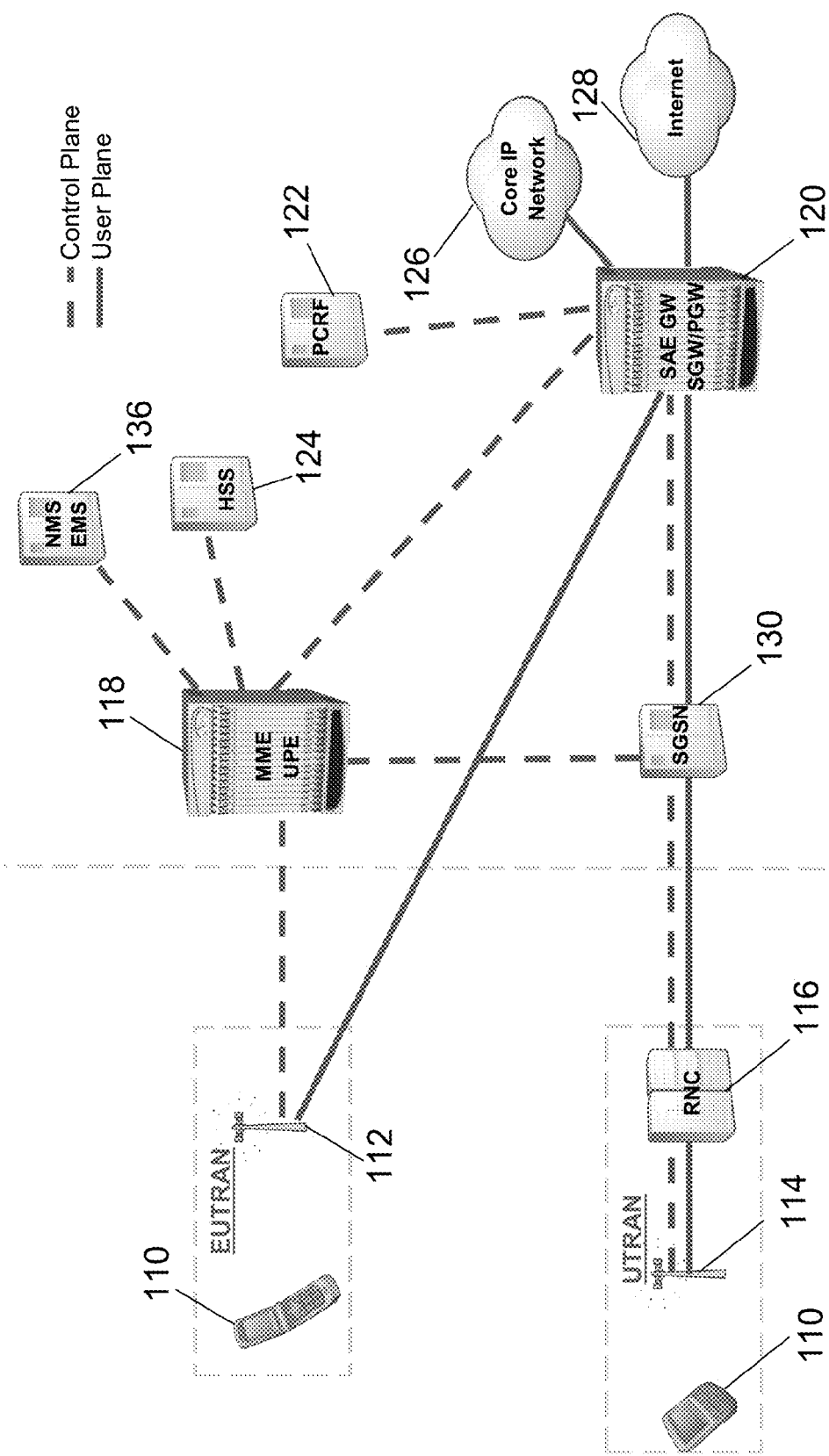
FIGS. 1-2 illustrate a communication network in accordance with some embodiments.

Certain embodiments disclose a method comprising establishing a first control connection between a home node and a home node gateway having a first control connection identity, establishing a second control connection between the home node gateway and a mobility management device having a second control connection identity, communicating network traffic sent between the home node and the mobility management device on behalf of a mobile device using the first control connection and the second control connection, receiving a mobile device identifier included in a control message sent from the mobility management device using the second control connection in response to an entity type indication sent to the mobility management device from the home node gateway, the mobile device identifier uniquely identifying the mobile device, and correlating the mobile device identifier with a context including the first control connection identity and the second control connection identity.

Example Embodiments

This disclosure relates generally to correlating unique identifiers for mobile devices with other connection information in communications networks. Mobile devices such as smartphones and cell phones have continued to proliferate at a rapid pace. At the same time, other home-based wireless network technologies such as Wi-Fi and Femto have taken hold to provide high bandwidth availability over a much shorter range than traditional wireless macro networks. In some cases, these home-based wireless network technologies can be connected into a service provider's core network, which is the same network that is used by the service provider's traditional wireless networks. This then allows the home-based wireless network to function as an extension of the service provider's traditional wireless network.

A host of problems can arise in providing services to mobile devices through these home-based wireless networks. For example, it is important to provide security to both the mobile device and the service provider's network from malicious attacks. It is also important to be able to identify the mobile device and correlate information about the mobile device and its connections in order to provide services to the mobile devices connected through these home-based wireless network technologies. Once the correlation is made, then the service provider can more easily manage the network including identification of problems, providing services to mobile devices, efficiently using network resources, and providing security. This disclosure describes correlating unique identifiers for mobile devices with other connection information.

In order to connect to a home-based wireless network, a home node can be used. A home node is a short-range wireless transceiver often installed in a home or business location to expand wireless network coverage to new such locations. Mobile devices are able to connect to home nodes, and, in turn, each home node can connect to a home node gateway. A home node gateway provides a connection point from the home-based wireless network into the core network of a service provider. A home node gateway is responsible for receiving traffic that is sent from mobile devices to a connected home node, and then passing this traffic on to the core network for delivery to destination nodes, such as other mobile devices. Home node gateways also communicate traffic back from the core network to mobile devices. A Home node gateway can also aggregate home node connections and interfaces with the rest of the network on behalf of those home nodes. Each home node gateway may serve many home nodes and each home node may serve many mobile devices. As with other nodes, the proper functioning of a home node gateway is important for network health as a whole. To ensure such proper operation of a home node gateway, it is important that home node gateway operators be able to understand the activity of the home node gateway to identify and correct any issues and make adjustments. In addition, many additional functionalities can be provided at the home node gateway once each connection can be mapped to the corresponding mobile device. For example, context information and profile information can be shared and remain persistent through handoffs.

Home node gateways function to communicate network traffic to and from mobile devices that are connected to the home nodes served by that home node gateway. However, the home node gateway is not generally aware of the identity of the other nodes in the path including the destination or originating mobile device. For example, messages from which the identity of a sending mobile device could otherwise be derived may be encrypted. Therefore, although home node gateways are able to forward network traffic on behalf of these mobile devices, home node gateways are not always able to identify and report on the identities of these mobile devices. This disclosure describes how a home node gateway can receive and store identifiers (IDs) for the mobile devices that it serves and correlate these IDs with stored connection information related to those mobile devices. In some embodiments, this connection information includes state dependent information about the mobile device or its connections and is referred to as a context.

Ordinarily, when a mobile device attaches wirelessly to a network node containing a radio transceiver, also called a base station, that base station connects directly to the core network. As such, messages from an attached mobile device can flow directly between the base station and the core network. However, if the base station is a home node then it often connects through another network in order to get to the core network. Also, to ensure security and interoperability, a home node gateway acts as an intermediary and a gate keeper to the core network. The home node gateway provides the interface to connect into the core network over another network such as the Internet. As a gateway, the home node gateway relays messages between the home node and the core network. In some embodiments, home nodes communicate with home node gateways using an Internet connection. This intermediate step gives home node operators the flexibility to place home node in any location with Internet access, rather than being constrained by physical proximity to a core network connection.

For example, if a mobile device attaches to a home node, it initiates connection to the network by seeking authentication from a wireless mobility management device. The wireless mobility management device resides in whole or part in the control plane of the network. As such, the wireless mobility management device exchanges control messages and makes control connections with other network devices in the core network. The wireless mobility management device can be implemented as a mobility management entity (MME) in some embodiments. The home node gateway is responsible for receiving the messages sent from the mobile device during this process and relaying those messages to the MME. As well, the home node gateway is responsible for relaying messages back from the MME to the home node for delivery to the mobile device. Through this process the home node establishes an active connection with the home node gateway and the home node gateway establishes an active connection with the MME. Both of these connections being associated with, and carrying data on behalf of, the initiating mobile device.

This disclosure describes a method and system where the home node gateway is provided with sufficient information to identify the mobile devices for which it relays traffic and to correlate these identities with the stored context information.

When a mobile device establishes a connection with an MME as relayed by a home node gateway, that MME learns the identity of the mobile device to properly authenticate and control the device. However, although the home node gateway is relaying the traffic during this process, it may not be able to learn the identity of that device by reading those relayed messages. For example, the MME may learn the identity of the device from an encrypted message relayed by the home node gateway, preventing the home node gateway from reading the identity as it relays the message. Alternatively, the MME may learn the identity of the device from another MME in the network based on a relayed temporary identifier associated with the mobile device. In this case, although the home node gateway may read the temporary identity contained in a relayed message, it is not able to learn the device's permanent identity. This disclosure describes a method and system by which the MME, regardless of how it learns the identity of the mobile device, passes this identity back to the home node gateway so that the gateway can correlate the identity with the context that it has established for that device.

FIG. 1 illustrates a network diagram in accordance with some embodiments. FIG. 1 illustrates a universal mobile telecommunication system (UMTS) network along with a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, a home subscriber server (HSS) 124, a core IP network 126, an Internet connection 128, a Serving General packet radio service Support Node (SGSN) 130 and a network management system (NMS)/element management system (EMS) 132. The MME 118, SGSN 130, and SAE GW 120 can be implemented in a gateway as described below. The SAE GW 120 can include a serving gateway (SGW) as well as a packet data network gateway (PGW). In some embodiments, the SGW and PGW can be implemented on separate network devices. The main component of the SAE architecture is the Evolved Packet Core (EPC), also known as SAE Core. The EPC includes the MME, SGW and PGW components. The MSC 132 controls and forwards circuit-switched traffic between the RNC 116 and the circuit-switched network 134. The user equipment (UE) can include a mobile phone, a laptop with wireless connectivity, a netbook, a smartphone, or any other wireless device.

MME 118 is a control node for the LTE access network. The MME 118 is responsible for UE 110 tracking and paging procedures including retransmissions. The MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identifiers for UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME 118 also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The PGW provides connectivity to the UE 110 to external packet data networks by being the point of exit and entry of traffic for the UE 110. A UE 110 may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 (CDMA 1X and EvDO).

The NMS/EMS 132 can provide management of the operation, administration, maintenance, and provisioning of a networked system. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment must be replaced, when a router needs a patch for an operating system image, when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) consists of systems and applications that manage network elements (NE) on the network element management layer (NEL) of the Telecommunication Management Network model.

Figure 2:
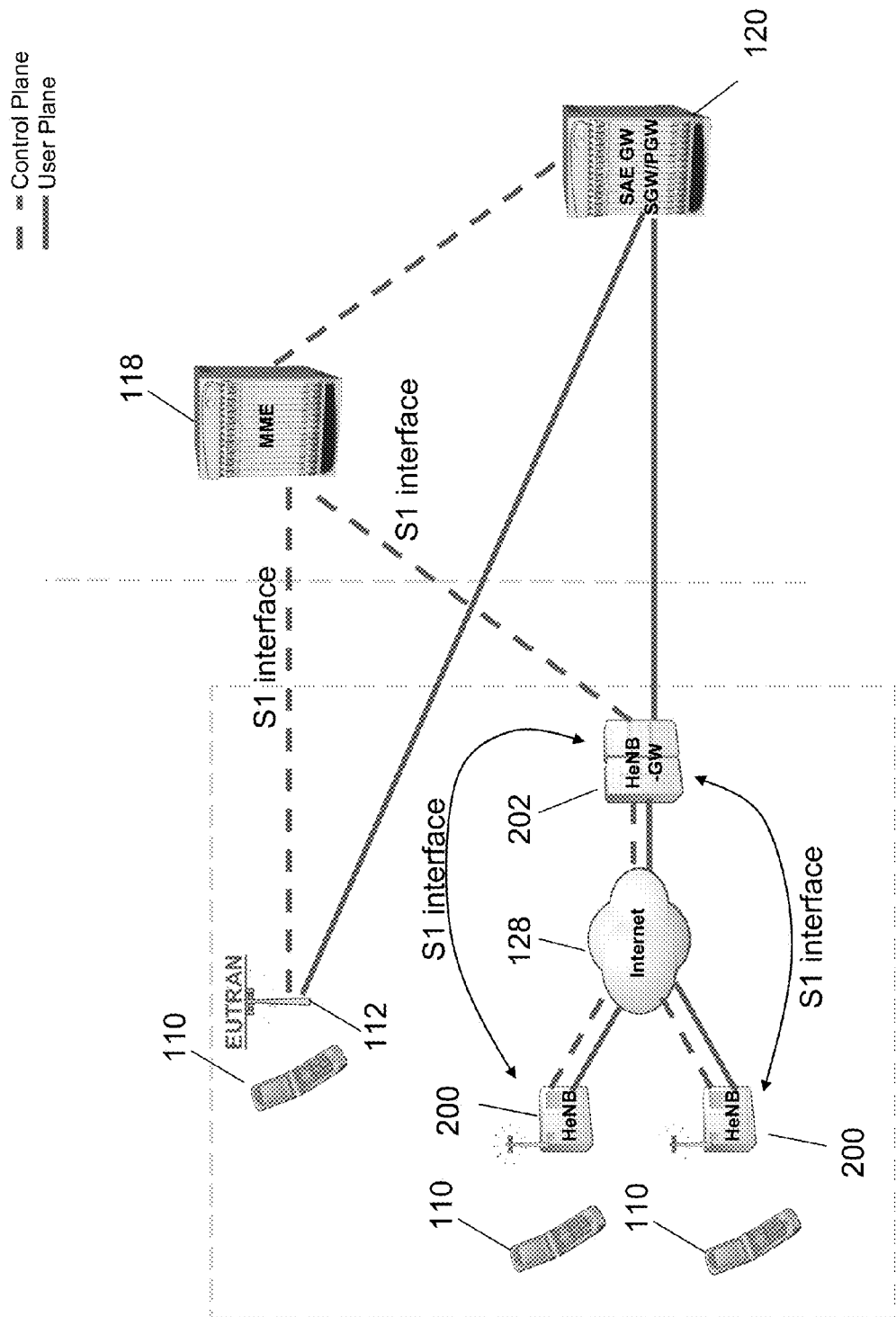

FIG. 2 illustrates a network diagram that include home nodes and a home node gateway in accordance with some embodiments. The network diagram of FIG. 2 includes user equipment (UE) 110, an evolved nodeB (eNB) 112, a mobility management entity (MME) 118, a system architecture evolution gateway (SAE GW) 120, an Internet connection 128, home evolved node Bs (HeNBs) 200 and a home evolved node B gateway (HeNB-GW) 202. FIG. 2 expands on FIG. 1 by including home nodes (the HeNBs 200) as additional E-UTRAN wireless access points and a home node gateway (the HeNB-GW 202) to provide network access to those home nodes.

The HeNBs 200 are short range wireless access points that provide wireless network access to UE 110. A HeNB 200 is a type of home node that provides wireless access to an LTE network using the E-UTRAN radio access technology. In some cases, the collective range of the eNBs 112 or other base stations that provide radio access to the network is not sufficient to reach all possible UE 110 locations. If these gaps in network coverage are undesirable, the coverage may be supplemented by the installation of home nodes such as HeNBs 200. For example, an individual interested in providing network coverage to their home or place of business that otherwise has insufficient network access may be interested in installing an HeNB 200 or a group of HeNBs 200 to provide such access. In some embodiments, the HeNBs 200 use femtocell transceivers with coverage similar to a WiFi (WLAN) access point. The HeNB-GW 202 acts as a concentrator of HeNB 200 connections, relaying network traffic between these HeNBs 200 and core network nodes such as the MME 118 or the SAE GW 120. The HeNB-GW 202 relays user plane network traffic between the HeNBs 200 and SAE GW 120. Similarly, the HeNB-GW 202 relays control plane traffic between the HeNBs 200 and the mobility management entity (MME) 118. The HeNBs 200 connect to the HeNB-GW 202 using an Internet connection 128. The HeNB-GW 202 is capable of serving many HeNBs 200.

As illustrated in FIG. 2, the connections between the HeNBs 200 and the HeNB-GW 202 use an S1 interface. As well, the connections between the HeNB-GW 202 or eNB 112 and the MME 118 use S1 interfaces. The S1 interface is defined by the S1 Application Protocol (S1AP) and provides for the transmission and receipt of specially formatted messages sent between a base station and a core network node on behalf of a mobile device to carry out network procedures. As such, S1 interfaces provide interconnection points between E-UTRAN and the EPC. Each S1AP message has a particular type and contains particular information elements, those information elements containing the information used to achieve a single step of a network procedure. For each particular S1AP message, some information elements are mandatory and some are optional. In other embodiments, other interfaces can be used to send control messages.

As described above, FIG. 2 illustrates control connections that are established between home nodes and a MME 118 of behalf of UE 110. A control connection may be a logical link or a session that is established at the connection endpoints to communicate data. The control connection may be communicated over wired mediums, wireless mediums, or a combination of the two. These control connections are established with a home node gateway acting as an intermediary to pass data between the home nodes and the MME 118. As part of the process of establishing these control connections, the home node gateway learns a unique identifier for the UE 110 from the MME 118.

The eNB 112 generally establishes a control connection with the MME 118 on behalf of a UE 110 using an S1 interface. When an S1 interface is used, the eNB 112 generates an eNB UE S1AP ID and sends the ID to the MME 118 to identify the connection from the perspective of the eNB 112. On receipt of this eNB UE S1AP ID, the MME 118 generates a MME UE S1AP ID and sends it back to the eNB 112 to identify the connection from the perspective of the MME 118. These UE S1AP IDs are stored by the eNB 112 and by the MME 118 as part of their context stored for the UE 110 on behalf of which the connection was established. Messages sent from the eNB 112 using this connection can include the MME UE S1AP ID and messages sent from the MME 118 using this connection can include the eNB UE S1AP ID. Through to use of such IDs, the eNB 112 and MME 118 are able to maintain many simultaneous S1 connections with each other while still identifying the particular connection for which each incoming message is intended.

An HeNB 200 can establish a control connection with a wireless mobility management device on behalf of a mobile device. The control connection can be established using an S1 interface, even if the control connection is made with a Home eNode B gateway. For example, the MME 118 on behalf of a UE 110 can establish a S1 connection with the HeNB-GW 202. In this case, the HeNB 200 and HeNB-GW 202 generate identifiers (IDs) for each connection leg. As such, the HeNB 200 can generate an eNB UE S1AP ID and the HeNB-GW 202 can generate an MME UE S1AP ID. These IDs are exchanged as the connection is established. The HeNB-GW then establishes a second S1 connection with the MME 118. For this second connection the HeNB-GW generates a second eNB UE S1AP ID and the MME generates a second MME UE S1AP ID. These IDs are exchanged between the HeNB-GW 202 and the MME 118 as the second connection is established. At this point, the HeNB 200 is aware of a pair of UE S1AP IDs, the MME 118 is aware of a separate and different pair of UE S1AP IDs and the HeNB-GW 202 is aware of both pairs. The HeNB-GW 202 uses these UE S1AP ID pairs to identify the two S1 connections that are used to relay data between the HeNB 200 and the MME 118 on behalf of the UE 110. The 4 UE S1AP IDs known to the HeNB-GW 202 are part of the context stored for the UE 110. However, as mentioned above, in existing implementations the HeNB-GW 202 is not aware of the identity of the UE 110 for which this context is stored.

In some embodiments, the identity of a UE 110 is defined by the International Mobile Subscriber Identity (IMSI) of that UE 110. This IMSI is permanently stored by the UE 110 and is sent from the UE 110 to the network for authentication and control purposes. To prevent fraudulent network access, IMSIs are generally kept private and are known only to UE 110 and the core network (not to eavesdroppers that may wish to impersonate a UE). As such, when an IMSI is sent from UE 110 to a MME 118, it is generally encrypted in a fashion such that only the MME can decrypt and read that IMSI. In other cases, if a UE 110 has previously been authenticated by the network it may send a temporary identifier that has been assigned to that UE by a MME 118 in place of sending a permanent identifier.

In some embodiments, the temporary identifier is a Globally Unique Temporary Identity (GUTI) allocated by a MME 118 and sent back to the UE 110 for future identification purposes. The HeNB-GW 202, even if able to read a temporary identifier assigned to a UE 110 while relaying messages, is not able to derive the permanent identity of that UE 110. Additionally, the temporary identifier may be encrypted for decryption by the MME 118. In any of these cases, when an HeNB-GW 202 relays a message containing an encrypted IMSI or a GUTI (encrypted or not), the HeNB-GW 202 is not able to learn the IMSI by reading these messages as it performs the relay. As such, the HeNB-GW 202 is not able to correlate these UE contexts with the UE's persistent ID. Similarly, in cases where a IMSI and/or GUTI has been assigned, the HeNB-GW 202 is not able to correlate the IMSI/GUTI of a UE 110 with the context stored for that UE 110.

This lack of an ability to correlate the UE's persistent ID with the UE context stored by the HeNB-GW 202 is problematic. For example, when a UE 110 disconnects and then later connects again, the home node gateway has no way to identify which UE is involved in the connection or link the UE to any prior connections. This may happen, for example, when a UE enters a battery-saving idle mode and then later reactivates. When a UE 110 enters this idle mode, the S1 connections established on its behalf through the HeNB-GW 202 are terminated. When the UE 110 later reactivates it again authenticates with the network and new S1 connections are established by the HeNB-GW 202 to relay traffic. In this case, the HeNB-GW 202 does not have enough information to correlate the previously created UE context with the new UE context, even though those contexts were created for the same UE 110. If a UE's IMSI could be obtained by the HeNB-GW 202 at the time that the S1 connections are established then the HeNB-GW 202 could correlate the old UE context with the new UE context because it would be able to identify that these contexts are associated with the same UE. Once a context can be correlated with a persistent ID of the UE, then the home node gateway can not only correlate other UE information on the home node gateway, but it also can collect and share information on a per-UE basis. This further enables provision of services at the home node gateway level on a per-UE or per-subscriber basis when other information is correlated to the connection information at the home node gateway. For example, if a UE's IMSI and/or GUTI is associated with the context information stored by the HeNB-GW 202 then the HeNB-GW 202 has enough information to report on activity or take action based on that IMSI/GUTI.

Figure 3:
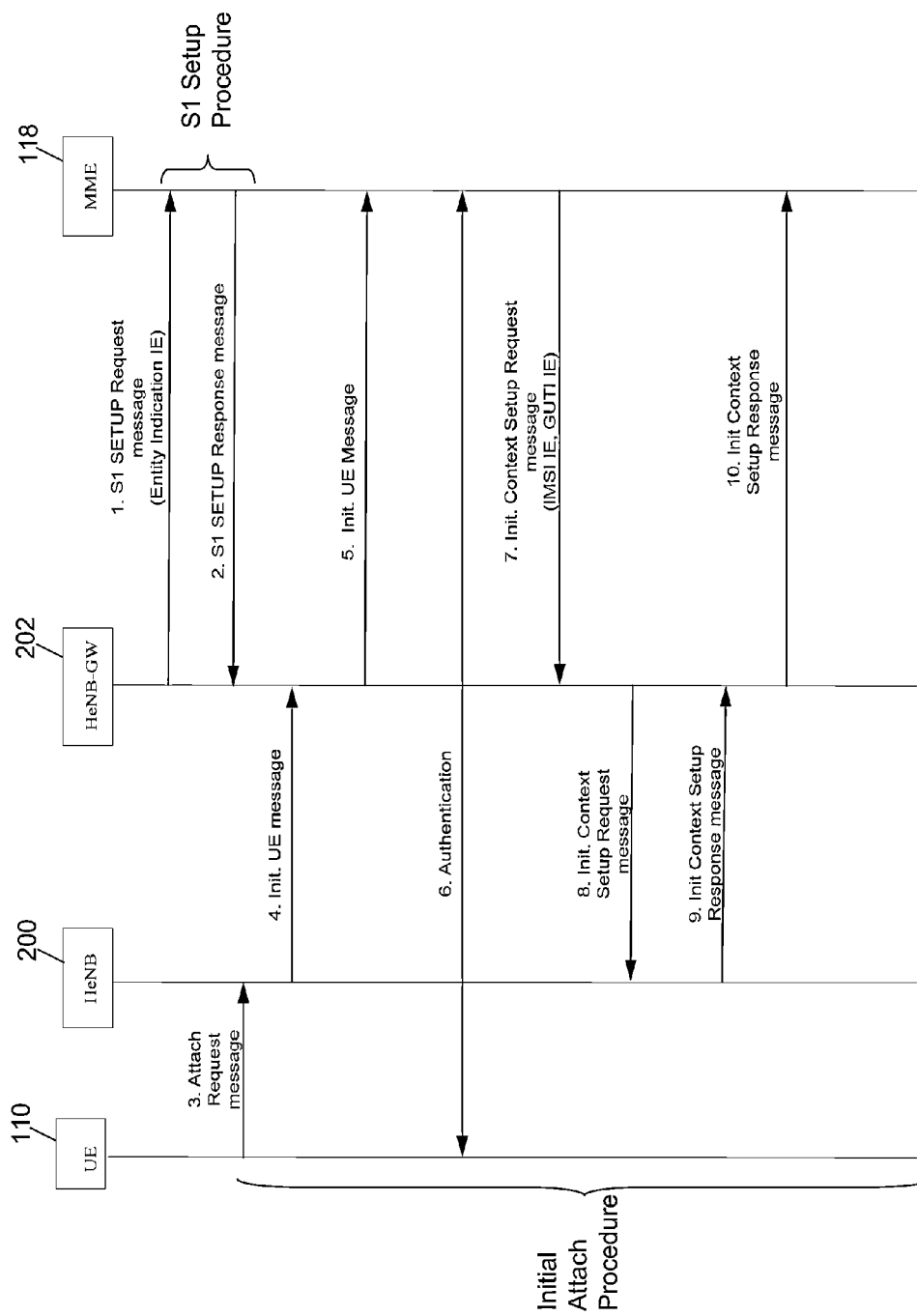
FIG. 3 is a message diagram illustrating a device attach procedure in accordance with some embodiments.

FIG. 3 is a sequence diagram illustrating a method of establishing a correlation between a UE's identity and the UE context information stored by a home node gateway in accordance with some embodiments. FIG. 3 includes user equipment (UE) 110, a home evolved node B (HeNB) 200, a home evolved node B gateway (HeNB-GW) 202 and a mobility management entity (MME) 118.

Steps 1 and 2 comprise the S1 SETUP procedure wherein information is exchanged between a base station and a MME, allowing these nodes to subsequently establish S1 connections. The HeNB-GW 202 initiates the S1 SETUP procedure with the MME 118 so that it can interoperate with the MME using the S1 interface. Once the S1 SETUP procedure completes, the HeNB-GW 202 and the MME 118 are able to establish S1 connections on behalf of UE 110. In Step 1, the HeNB-GW 202 initiates the S1 SETUP procedure by sending a S1 SETUP Request message containing the information used to establish subsequent S1 connections and an Entity Indication information element (IE). This Entity Indication information element informs the MME 118 that the sending entity is an HeNB-GW (as opposed to an eNB, for example). The MME 118 stores this indication as part of its context information associated with the sending HeNB-GW 202. In Step 2, the MME 118 sends a S1 SETUP Response message to the HeNB-GW 202 confirming receipt of the request message and including information used to establish S1 connections in the future.

Steps 3 through 10 comprise a portion of the Initial Attach procedure during which a UE 110 registers with the network for authentication and control purposes. In Step 3, the UE 110 initiates the Initial Attach procedure by sending a wireless Attach Request message to the HeNB 110. In some embodiments where a GUTI has previously been assigned to this UE 110, the Attach Request message contains that GUTI to identify the UE. In other embodiments, this message contains the IMSI of the UE 110, but the message is encrypted. In Step 4, the HeNB 200 packages the Attach Request message into a S1 Initial UE message designed to be read by the MME 118 and forwards this newly-packaged message to the HeNB-GW 202, initiating a new S1 connection. Included in this message is a new eNB UE S1AP ID generated by the HeNB 200 that will be used by the receiving HeNB-GW 202 to identify this connection.

In Step 5, the HeNB-GW 202 forwards the Initial UE message to the MME 118, initiating a second new S1 connection. As a part of this initiation, the HeNB-GW generates a second eNB UE S1AP ID, replaces the eNB UE S1AP ID generated by the HeNB 200 in Step 4 with this newly generated ID, and then forwards the message. At this point, the HeNB-GW 202 has begun building UE context information associated with the UE initiating this procedure, Such as the 2 eNB UE S1AP IDs. In Step 6, the MME 118 communicates with the UE 110 (via the HeNB-GW 202 and HeNB 200) and other core network nodes (such as the HSS) to authenticate the UE and determine whether to grant its attach request.

In Step 7, having determined to grant the attach request, the MME 118 initiates the creation of its own UE context by sending an Initial Context Setup Request message to the HeNB-GW 202 (to be forwarded to the HeNB 200). At this point, the MME 118 generates the MME UE S1AP ID that will be used for the S1 connection between the MME 118 and the HeNB-GW 202 and includes it in the message. As well, the MME 118, having learned that the HeNB-GW 202 is indeed an HeNB-GW (as opposed to an eNB) in Step 1, includes in this message IMSI and GUTI information elements containing, respectively, the IMSI and GUTI of the UE 110.

In Step 8, the HeNB-GW 202 receives the Initial Context Setup Request message from the MME 118 and adds the included MME UE S1AP ID, IMSI and GUTI to the UE context that it is building for the UE 110. As well, the HeNB-GW 202 generates its own MME UE S1AP ID that it will use for its S1 connection with the HeNB 200. The HeNB-GW 202 strips the IMSI and GUTI information elements from the Initial Context Setup Request message, replaces the MME UE S1AP ID generated by the MME 118 with its own newly generated MME UE S1AP message and then forwards the message to the HeNB 200 using the eNB UE S1AP ID generated by the HeNB 200 in Step 4.

The UE context includes the data stored by a home node gateway that is related to a particular UE 110. UE context may contain, for example, information used to establish and maintain connections established on behalf of that UE 110, information describing the past behavior of that UE 110, or information about that UE's 110 subscriptions or allowable network activity. After step 8, the UE context for the UE 110 in HeNB-GW 202 can include 2 eNB UE S1AP IDs (one generated by the HeNB 200 in Step 4 and one generated by the HeNB-GW 202 in Step 5), 2 MME UE S1AP IDs (one generated by the MME 118 in Step 7 one generated by the HeNB-GW 202 in Step 8), the UE's IMSI and the UE's GUTI (received from the MME 118 in Step 7).

In Step 9 the HeNB 200 responds with an Initial Context Setup Response message containing the information requested by the MME 118 to establish its UE context and sends it to the HeNB-GW 202 using the MME UE S1AP ID received from the HeNB-GW 202 in Step 8. In Step 10 the HeNB-GW relays the Initial Context Setup Response message to the MME 118 using the MME UE S1AP ID received from the MME 118 in Step 7.

Figure 4:
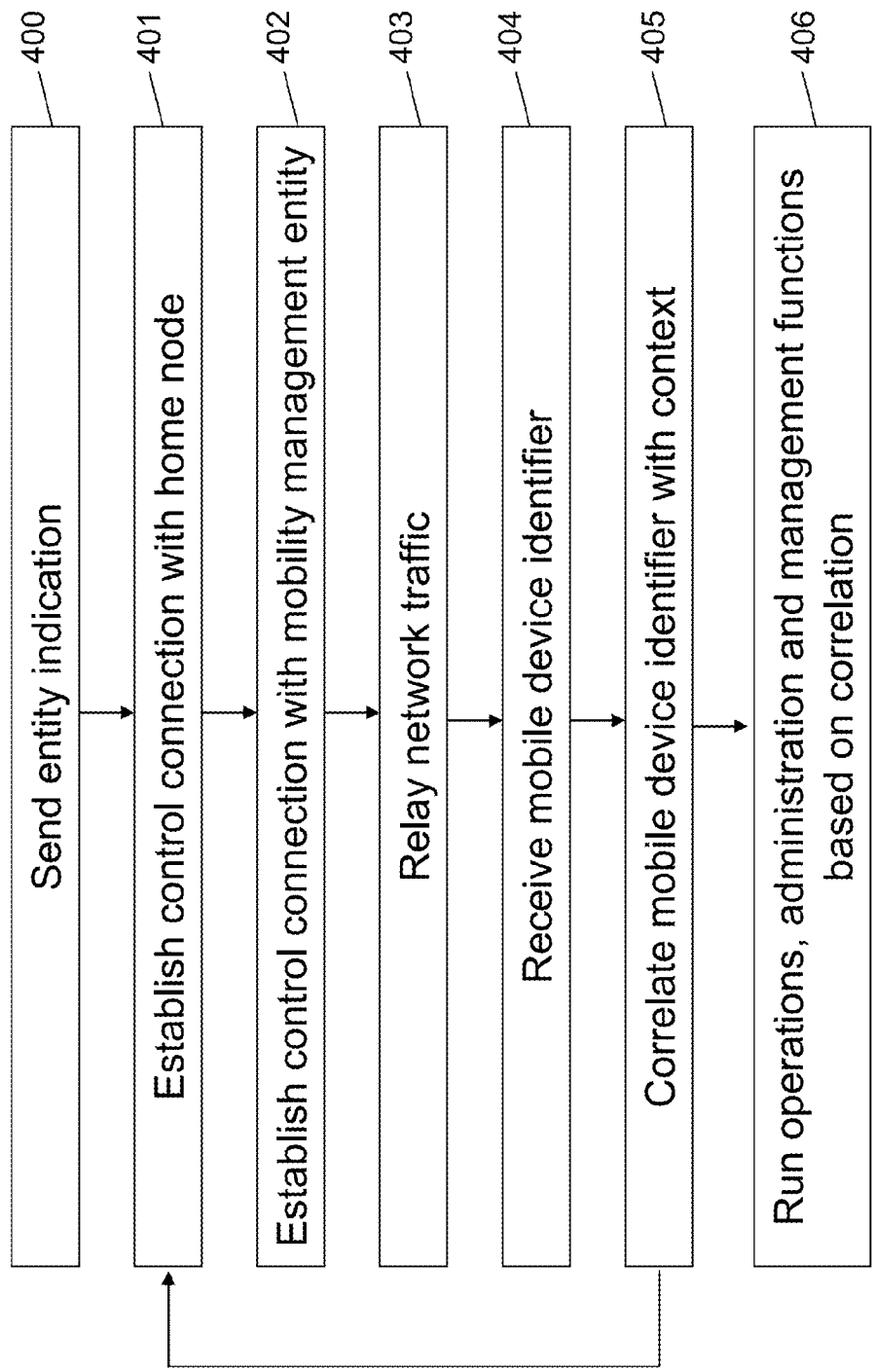
FIG. 4 is a flow chart illustrating a method of correlating user equipment context with user equipment identity in accordance with some embodiments.

FIG. 4 illustrates a method of correlating sequentially created UE contexts on a home node gateway using the unique mobile device identifier received from an MME in accordance with some embodiments. In Step 400, the home node gateway sends a message to the MME that identifies itself as a home node gateway. In some embodiments, this step is performed by sending an entity indication during the S1 SETUP procedure as illustrated in FIG. 3. In Step 401, the home node gateway establishes a control connection with a home node. In Step 402, the home node gateway establishes a control connection with the MME. In some embodiments, these control connections are S1 connections.

The control connections established in Steps 401 and 402 allow the home node gateway to relay data between the home node and the MME on behalf of a UE that is newly-attached to the home node. Each of these control connections has a unique connection identifier. In embodiments where these control connections are S1 connections, each unique connection identifier is a pair of S1AP IDs. In these embodiments, the control connections may be established as part of an Initial Attach procedure run between the UE and the MME as illustrated in FIG. 3. The UE may be newly attached to the home node because it has re-entered active mode from a battery-saving idle mode or because it has newly entered the geographic territory served by the home node. The newly attached UE may or may not have been previously served by the home node gateway. During Steps 401 and 402 the home node gateway builds a UE context containing the unique connection identifiers.

In Step 403 the home node gateway relays data between the home node and the MME using the control connections established in Steps 401 and 402. In Step 404, the home node gateway receives the UE's unique identifier from the MME across the control connection established in Step 402 as part of one the messages relayed in Step 403. In some embodiments, this unique identifier can be the UE's IMSI and/or GUTI.

In Step 405, the home node gateway correlates the UE's unique identifier with the context for that UE by storing the identifier with the UE context created in Steps 401 and 402. If the home node gateway had previously built a context for the UE as identified in Step 404, the home node gateway can correlate the current UE context with any previously created UE context as well. The home node gateway may do this by adding new data to the previously-created UE context or by updating data in the previously-created UE context. By correlating UE identifiers with UE context information, the home node gateway can correlate UE identity with all of the sequentially created context information for that UE. After Step 405, the method may return to Step 401 when a UE attaches to one of the home nodes served by the home node gateway.

In Step 406, the home node gateway runs operations, administration and management (OA & M) functions based on correlating the identity of the UE with the UE contexts created in Step 405. There are many OA & M functions made possible when UE identity is so correlated with UE context. One such function is that the home node gateway is able to report on the number of unique UEs on behalf of which traffic was relayed through that home node gateway. This advantage is particularly pronounced in situations where the home node gateway and the MME are operated by separate vendors. In this case, the operator of the home node gateway is able to report based on the unique identities of the UE that the home node gateway has served without need to co-ordinate with the operator of the MME. Another function made possible when the identity of the UE being served by a home node gateway is known to that home node gateway is that UE identity-based blacklisting or access control can be implemented. In some embodiments, the home node gateway could selectively limit the traffic that it will relay on behalf of UE's with specific IMSIs or categories of IMSIs.

While FIG. 3 illustrates a method of correlating UE identity with the UE context information stored by an HeNB-GW during the Initial Attach procedure that is run when a UE enters active mode, it is also possible for UE context information to be stored during a handover procedure that occurs while a UE remains in active mode. For example, a UE may switch from the radio range of a first HeNB to the radio range of a second HeNB while remaining in active mode. If this occurs, the UE initiates an intra-LTE handover procedure wherein core network nodes are updated to reflect the UE's second HeNB. There are two types of handover procedures in LTE for UEs in active mode: X2 handover and S1 handover. X2 handover occurs in cases where the first HeNB and the second HeNB share a direct interface (using the X2 Application Protocol). In these cases, the first HeNB transmits its context information for that UE directly to the second HeNB. The second HeNB then informs the MME of the UE's new location by sending a Path Switch Request message. S1 handover occurs when there is no X2 interface between the first HeNB and the second HeNB. In the S1 handover cases, the first HeNB informs the MME using S1 connections that a handover to the second HeNB is requested and the MME initiates a connection with the second HeNB, again using S1 connections, in a Handover Request message.

Figure 5:
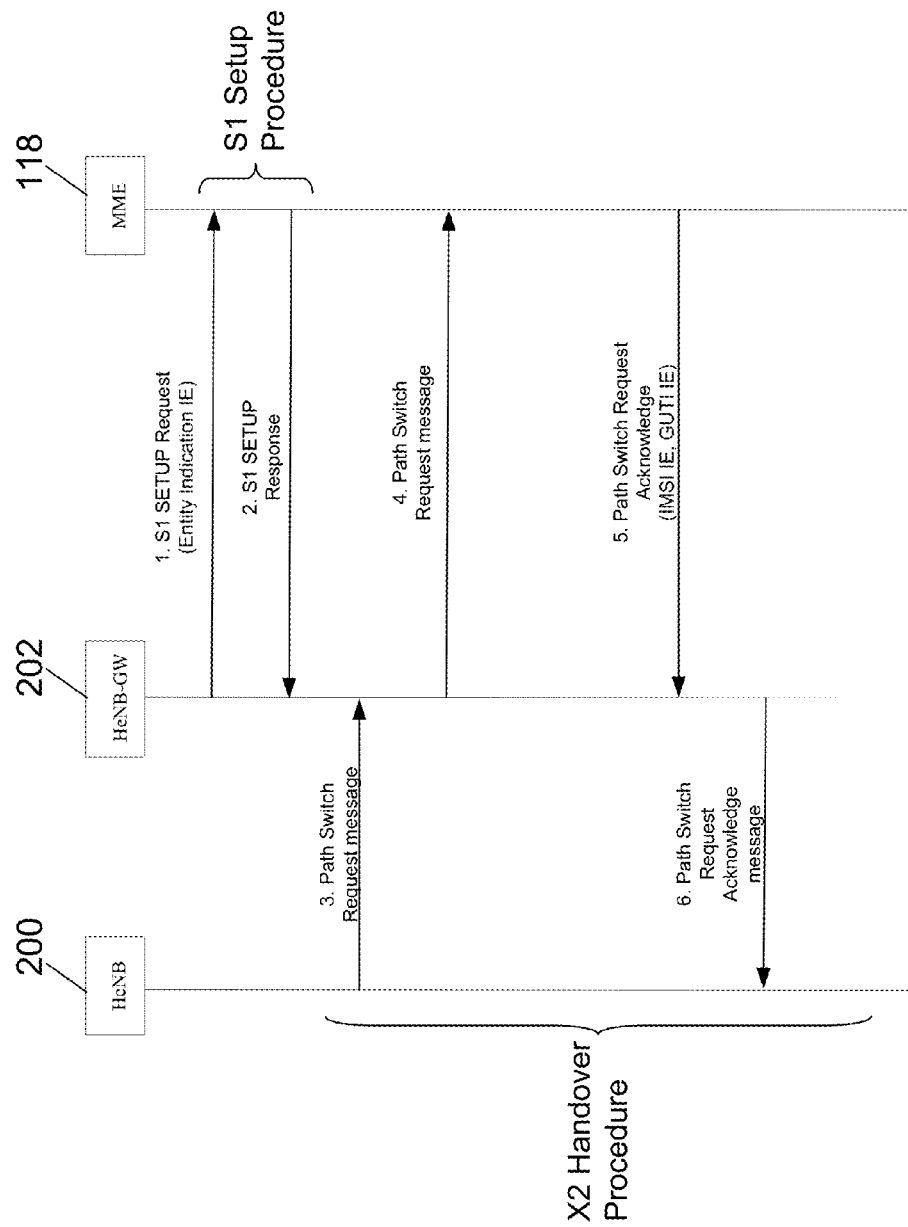
FIGS. 5-7 are message diagrams illustrating network procedures in accordance with some embodiments.

FIG. 5 is a message diagram illustrating a method of establishing a correlation between a UE's identity and the UE context information stored by an HeNB-GW during an intra-LTE X2 handover procedure in accordance with some embodiments. FIG. 5 includes a home evolved node B (HeNB) 200, a home evolved node B gateway (HeNB-GW) 202 and a mobility management entity (MME) 118. Steps 1 and 2 are the same as Steps 1 and 2 which run the S1 SETUP procedure as illustrated by FIG. 3 wherein the HeNB-GW 202 and the MME 118 exchange information to allow subsequent S1 connections between these nodes. These steps occur before the handover is initiated. As in Step 1 of FIG. 3, the HeNB-GW 202 indicates to the MME 118 in Step 1 that it is an HeNB-GW (as opposed to an eNB, which can also initiate an S1 SETUP procedure with a MME).

In Step 3, the HeNB 200 sends a Path Switch Request message to the HeNB-GW 202 using an S1 connection for relay to the MME 118. This Path Switch Request message informs the MME 118 that the HeNB 200 is now serving an active UE and has received the context information from the first HeNB to which the UE was previously attached. During this step the HeNB 200 generates an eNB UE S1AP ID to identify the HeNB 200 side of the S1 connection between the HeNB-GW 202 and the HeNB 200. At this point, the HeNB-GW 202 begins to build a UE context for the UE on behalf of which the S1 connection is being established. At this point the UE Context includes the eNB UE S1AP ID generated by the HeNB 200.

In Step 4, the HeNB-GW relays the Path Switch Request message to the MME 118. During this step, the HeNB-GW 202 generates a second eNB UE S1AP ID to identify the HeNB-GW side of the S1 connection between the HeNB-GW 202 and the MME 118. The HeNB-GW 202 adds this ID to its stored UE context.

In Step 5, the MME 118 sends a Path Switch Request Acknowledge message to the HeNB-GW 202 for relay to the HeNB 200. Having learned that the HeNB-GW 202 is indeed an HeNB-GW in Step 1, the MME 118 includes information elements containing the IMSI and/or GUTI of the UE so that the HeNB-GW 202 can correlate its context information for the connection to the identity of that UE using these identifiers. During this step, the MME generates a MME UE S1AP ID to identify the MME side of the S1 connection between the HeNB-GW 202 and the MME 118. Together with the eNB UE S1AP ID generated by the HeNB-GW 202 in Step 4, these IDs uniquely identify the S1 connection between the HeNB-GW 202 and the MME 118. The HeNB-GW 202 adds the MME UE S1AP ID, the IMSI and the GUTI to its stored UE context. By storing the IMSI and GUTI with the UE context information, the HeNB-GW 202 is able to correlate the stored UE context with the identity of the UE for which the context has been established.

In Step 6, the HeNB-GW 202 relays the Path Switch Request Acknowledge message to the HeNB 200. The HeNB-GW 202 removes the information elements containing the IMSI and GUTI of the UE because those information elements were intended for the HeNB-GW 202 and not for relay to the HeNB 200. During this step, the HeNB-GW 202 generates a second MME UE S1AP ID to identify the HeNB-GW side of the S1 connection between the HeNB-GW 202 and the HeNB 200, adding this ID to its stored UE context. Together with the eNB UE S1AP ID generated by the HeNB 200 in Step 3, these IDs uniquely identify the S1 connection between the HeNB-GW 202 and the HeNB 200. At this point, the UE context stored by the HeNB-GW 202 includes the four S1AP IDs used for the two S1 connections established to relay data between the HeNB 200 and the MME 118. As well, the UE context stored by the HeNB-GW 202 includes the IMSI and GUTI for the UE received from the MME 118 in Step 5.

Figure 6:
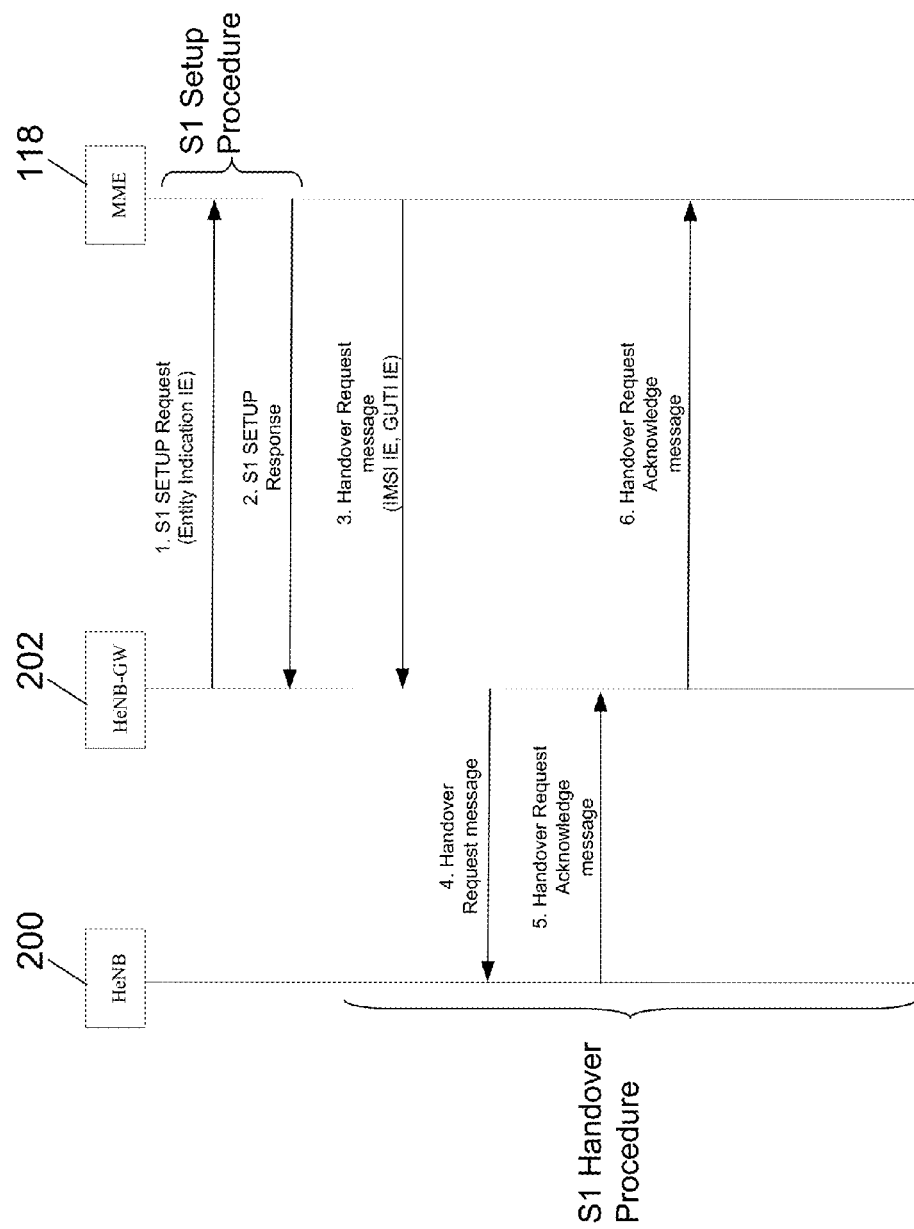

FIG. 6 is a message diagram illustrating a method of establishing a correlation between a UE's identity and the UE context information stored by an HeNB-GW during an intra-LTE S1 handover procedure in accordance with some embodiments. FIG. 6 includes a home evolved node B (HeNB) 200, a home evolved node B gateway (HeNB-GW) 202 and a mobility management entity (MME) 118. Steps 1 and 2 are the same as Steps 1 and 2 which run the S1 SETUP procedure as illustrated by FIG. 3 wherein the HeNB-GW 202 and the MME 118 exchange information to allow subsequent S1 connections between these nodes. These steps occur before the handover is initiated. As in Step 1 of FIG. 3, the HeNB-GW 202 indicates to the MME 118 that it is an HeNB-GW (as opposed to an eNB, which can also initiate an S1 SETUP procedure with a MME).

In Step 3 the MME 118 sends a Handover Request message to the HeNB-GW 202 using an S1 connection for relay to the HeNB 200. This Handover Request message informs the HeNB 200 that the HeNB 200 will now be serving an indicated active UE, the MME having already received the context information for that UE from the HeNB to which the UE was previously attached. Having learned that the HeNB-GW 202 is indeed an HeNB-GW in Step 1, the MME 118 includes the information elements containing the IMSI and GUTI of the UE so that the HeNB-GW 202 can correlate its context information for the connections to the identity of that UE. During this step, the MME 118 generates a MME UE S1AP ID to identify the MME side of the S1 connection between the HeNB-GW 202 and the MME 118. At this point, the HeNB-GW 202 begins to build a UE context for the UE on behalf of which the S1 connection has been established. The UE Context includes the MME UE S1AP ID generated by the MME 118 and the IMSI and GUTI of the UE as received by the HeNB-GW 202.

In Step 4, the HeNB-GW 202 relays the Path Switch Request message to the HeNB 200. During this step, the HeNB-GW 202 generates a second MME UE S1AP ID to identify the HeNB-GW side of the S1 connection between the HeNB-GW 202 and the HeNB 200, adding this ID to the stored UE context. The HeNB-GW 202 removes the information elements containing the IMSI and GUTI of the UE because those information elements were intended for use by the HeNB-GW 202 rather than for relay to the HeNB 200.

In Step 5, the HeNB 200 sends a Handover Request Acknowledge message to the HeNB-GW 202 using a second S1 connection for relay to the MME 118. During this step, the HeNB 200 generates an eNB UE S1AP ID to identify the HeNB side of the S1 connection between the HeNB-GW 202 and the HeNB 200. Together with the MME UE S1AP ID generated by the HeNB-GW 202 in Step 4, these IDs uniquely identify the S1 connection between the HeNB-GW 202 and the HeNB 200. The HeNB-GW 202 adds the eNB UE S1AP ID to its stored UE context.

In Step 6, the HeNB-GW 202 relays the Handover Request Acknowledge message to the MME 118. During this step, the HeNB-GW generates a second eNB UE S1AP ID to identify the HeNB-GW side of the S1 connection between the HeNB-GW 202 and the MME 118. Together with the MME UE S1AP ID generated by the MME 118, these IDs uniquely identify the S1 connection between the HeNB-GW 202 and the MME 118. The HeNB-GW 202 adds the second eNB UE S1AP ID to its stored UE context. At this point, the UE context stored by the HeNB-GW 202 includes the four S1AP IDs of the two S1 connections established to relay data between the MME 118 and the HeNB 200. The UE context also includes the IMSI and GUTI of that UE so that the context stored for the UE can be correlated with the identity of that UE.

Figure 7:
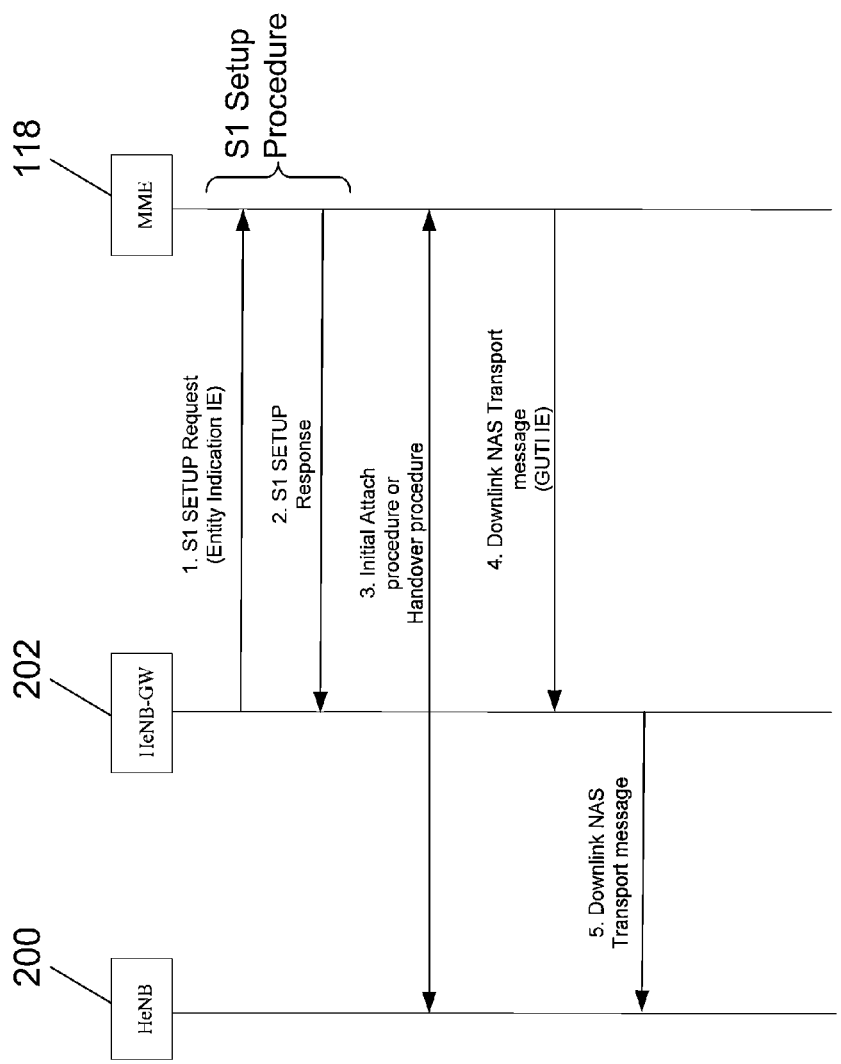

FIG. 7 is a message diagram illustrating a method of updating the UE context information stored by an HeNB-GW to correlate with a new temporary identity generated for that UE in accordance with some embodiments. FIG. 7 includes a home evolved node B (HeNB) 200, a home evolved node B gateway (HeNB-GW) 202 and a mobility management entity (MME) 118. Steps 1 and 2 are the same as Steps 1 and 2 which run the S1 SETUP procedure as illustrated by FIG. 3 wherein the HeNB-GW 202 and the MME 118 exchange information to allow subsequent S1 connections between these nodes. As in Step 1 of FIG. 3, the HeNB-GW 202 indicates to the MME that it is an HeNB-GW (as opposed to an eNB, which can also initiate an S1 SETUP procedure with a MME).

In Step 3, the initial attach procedure as illustrated in FIG. 3 or one of the handover procedures as illustrated in FIGS. 4 and 5 occurs. As described above, while the HeNB-GW 202 relays messages between the MME 118 and the HeNB 200 to complete these procedures, the HeNB-GW builds a UE context for the UE on behalf of which these procedures are run. At the completion of these procedures, this UE context includes the two S1AP IDs generated to identify the S1 connection between the HeNB 200 and the HeNB-GW 202 and the two S1AP IDs generated to identify the S1 connection between the HeNB-GW 202 and the MME 118. The UE context also includes the IMSI and GUTI of the UE as sent by the MME 118 during these procedures.

In Step 4, the MME 118 sends a Downlink Non-Access Stratum (NAS) Transport message to the HeNB-GW 202 for relay to the HeNB 200. A Downlink NAS transport message is an S1 message which contains a NAS message. A NAS message is a control message formatted using the NAS protocol intended for wireless delivery to a UE. NAS messages and the NAS protocol are used to carry out mobility and session management functions, such as a GUTI reallocation. As mentioned above, a GUTI is a temporary identifier assigned to a UE to temporarily identify that UE within a network in place of that UE's IMSI. As this GUTI is temporary, it is occasionally reallocated by the core network and, when such a reallocation occurs, the new GUTI is sent to the UE using a NAS message, which is packaged inside of a NAS Transport message, as illustrated in Step 4.

Also included in the Downlink NAS Transport message sent in the Step 4 is an S1 information element containing the new GUTI readable by the HeNB-GW 202. The MME 118 included this information element in the message because the HeNB-GW 202 indicated to the MME 118 in Step 1 that is an HeNB-GW. This information element is used because, although the NAS message itself contains the new GUTI, this message may be encrypted or otherwise unreadable by the HeNB-GW 202. When the HeNB-GW 202 receives the GUTI information element sent in Step 4, it updates the GUTI stored in the UE context established in Step 3 with the new GUTI. In this way, the UE context is correlated with the up-to-date GUTI of the UE for which the UE context is stored. In Step 5, the HeNB-GW strips the GUTI information element from the downlink NAS transport message and relays it using the previously-established S1 connection to the HeNB 200. Although this information element is stripped out by the HeNB-GW before the NAS Transport message is relayed, the NAS message itself remains unaltered and readable by the UE to inform that UE of its new GUTI.

Figure 8:
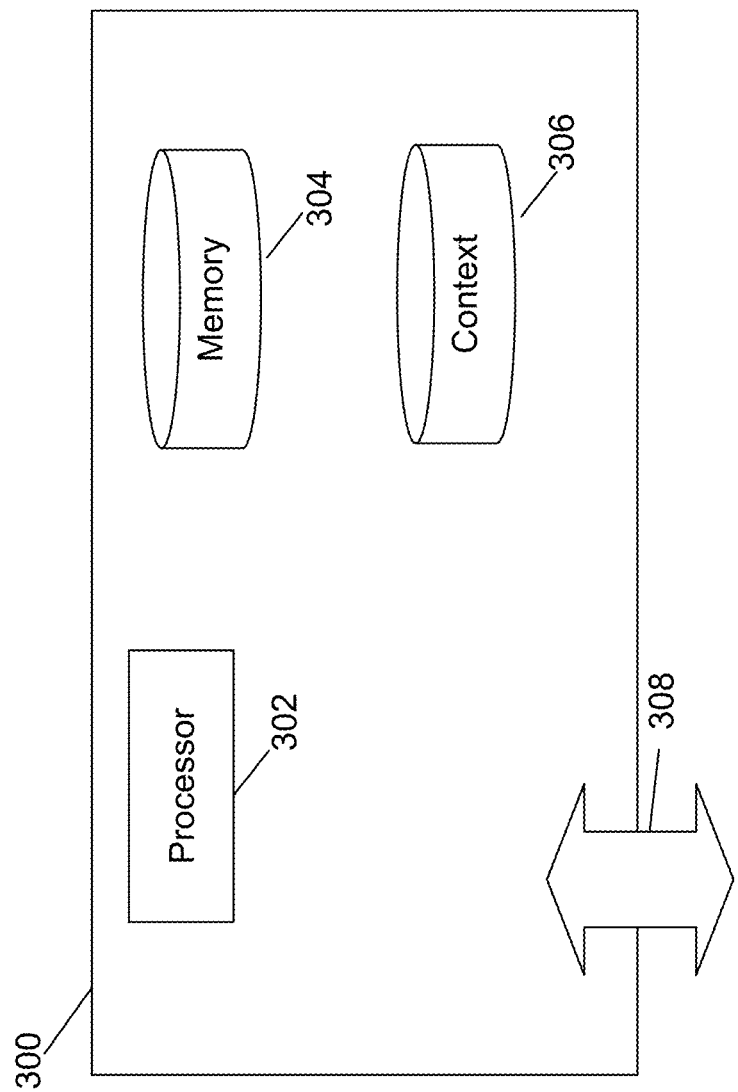
FIG. 8 illustrates a logical view of a home node gateway in accordance with some embodiments.

FIG. 8 illustrates a logical view of a home node gateway 300 in accordance with some embodiments. The gateway 300 can include one or more of a processor 302, a memory 304, a context data structure 306 and an interface 308. An interface 308 can provide an input and/or output mechanism to communicate with other network devices. The interface 308 can provide communication with other gateways, application servers, and user equipment, as well as other core network nodes to send and receive data such as packets and messages. The interface 308 can be implemented in hardware to send and receive signals in a variety of mediums, such as optical, copper, and wireless, and in a number of different protocols some of which may be non-transient. A processor 302 runs software which uses the interface 308 and the memory 304 such as a tangible, non-transitory computer readable medium, a programmable read only memory (PROM), or flash memory. The context data structure 306 stores information associated with the UE served by the home node gateway 300. The processor 302 accesses and updates the context data structures 306.

The home node gateway 300 includes software which is configured to identify the home node gateway 300 to a MME as a network device of type home node gateway and to relay data, using the interface 308, between the MME and a home node. In some embodiments, the home node gateway 300 identifies itself to a MME as it runs the S1 SETUP procedure, during which the home node gateway 300 exchanges information with the MME using the interface 308 to enable S1 connections to be established between the home node gateway and the MME. Once the S1 SETUP procedure has been run, the home node gateway 300 is configured to create S1 connections with the MME on behalf of user equipment and the MME is aware that home node gateway 300 is a network device of type home node gateway.

The home node gateway 300 additionally includes software which is configured to relay network traffic between a MME and a home node on behalf of a UE. A home node gateway 300 will first learn of a UE when it receives a message from a MME intended for relay to a home node and eventual delivery to a UE or when it receives a message from a home node which originated from a UE and is intended for relay to a MME. In some embodiments, the first time that a home node gateway receives a message for relay on behalf of a UE, it establishes two S1 connections which are used to relay the initial message and future messages that are to be relayed on behalf of that same mobile device. In this way, once a home node gateway 300 learns of a UE and establishes S1 connections to relay traffic for that UE between the home node and the MME, it continues to use those connections while relaying further traffic. The home node gateway 300 continues to use those S1 connections to relay traffic on behalf of the UE until the home node gateway is instructed to terminate the S1 connections. This may happen, for example, when the UE enters a battery-saving idle mode during which the UE does not maintain active connections.

As well, the first time that a home node gateway 300 learns of a UE in one of the above fashions, the home node gateway 300 begins establishing a context data structure 306 that is associated with that UE. In some embodiments, the context data structure 306 will initially include the information used to maintain the S1 connections to relay network traffic. This information includes two pairs of S1AP IDs, each pair uniquely identifying one of the S1 connections established by the home node gateway. The home node gateway 300 is configured to read the messages that it receives from the MME for relay to the home node, determine when the MME has included information identifying the UE on behalf of which the message has been relayed, and, when the UE is so identified, correlate that identifying information with the information stored for that UE in the context data structure 306. The home node gateway can expect the MME to include this identifying information based on having earlier identified itself to the MME as a network device of type home node gateway. In some embodiments, the identifying information includes the International Mobile Subscriber Identity (IMSI), the Globally Unique Temporary Identity (GUTI), or any other type of unique identifier. The home node gateway can also expect the MME to send an updated GUTI if a previously sent GUTI is reallocated. When the home node gateway receives such identifying information, it adds it to the context data structure 306 associated with that UE. In this way, the identity of the UE can be correlated with context information stored by the home node gateway for that UE.

As mentioned above, by correlating UE identity with UE context information within the home node gateway 300, the home node gateway 300 is able to offer many functions using the identity of the UE including operations, administration and maintenance (OA & M) functions. In some embodiments, when provided with a specific IMSI/GUTI or group of IMSIs/GUTIs, the home node gateway is able to offer reports detailing the context information that is correlated with those IMSIs/GUTIs. For example, these reports aid home node gateway operators by allowing those operators to identify problematic connections associated with IMSIs having reported connectivity issues or to identify IMSIs associated with problematic behavior. Additionally, having correlated UE context with UE identity, the home node gateway 300 is able to restrict or limit traffic that is relayed on behalf of those UEs or identify the number of unique UEs on behalf of which the home node gateway has relayed traffic.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The home node gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

Figure 9:
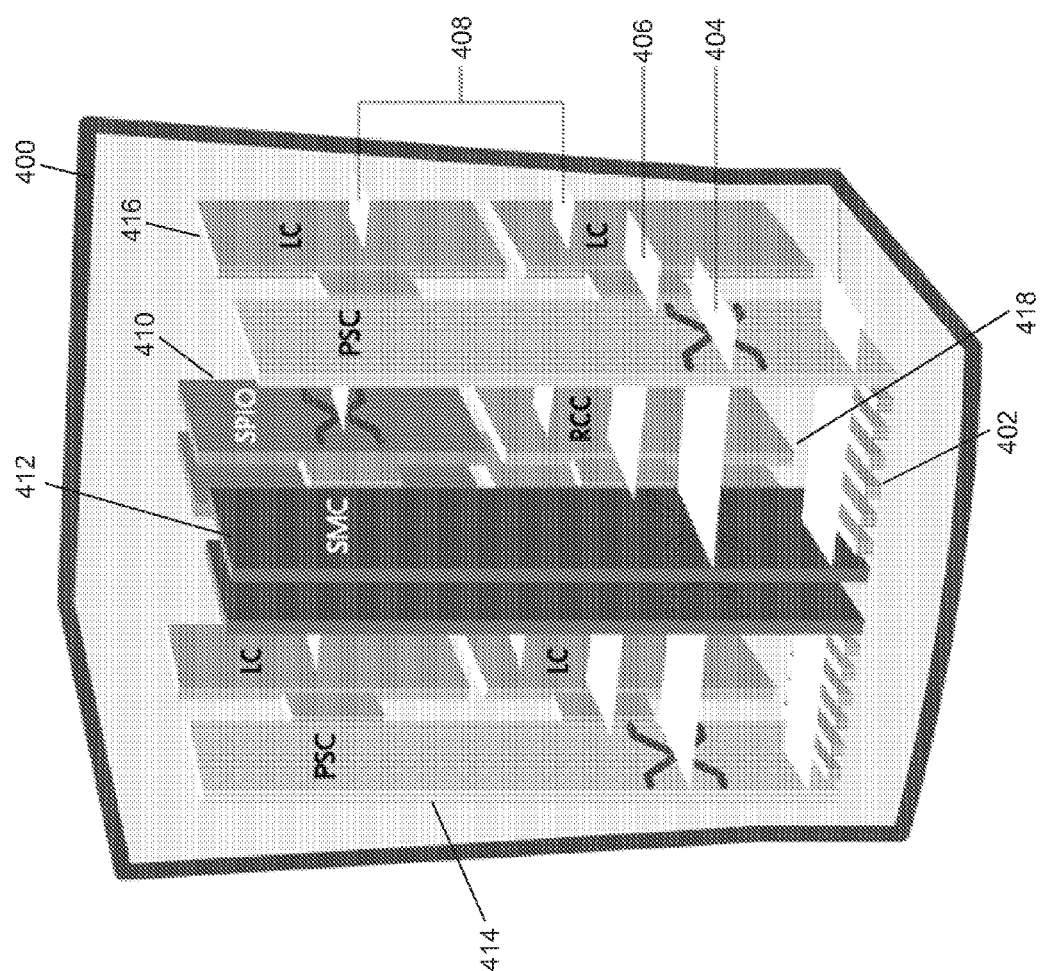
FIG. 9 illustrates a network device in accordance with some embodiments.

In certain embodiments, the functionalities are provided by a combination of hardware and software in the network device. General purpose hardware can be configured in the network device to provide one or more of these specialized functionalities. In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 10:
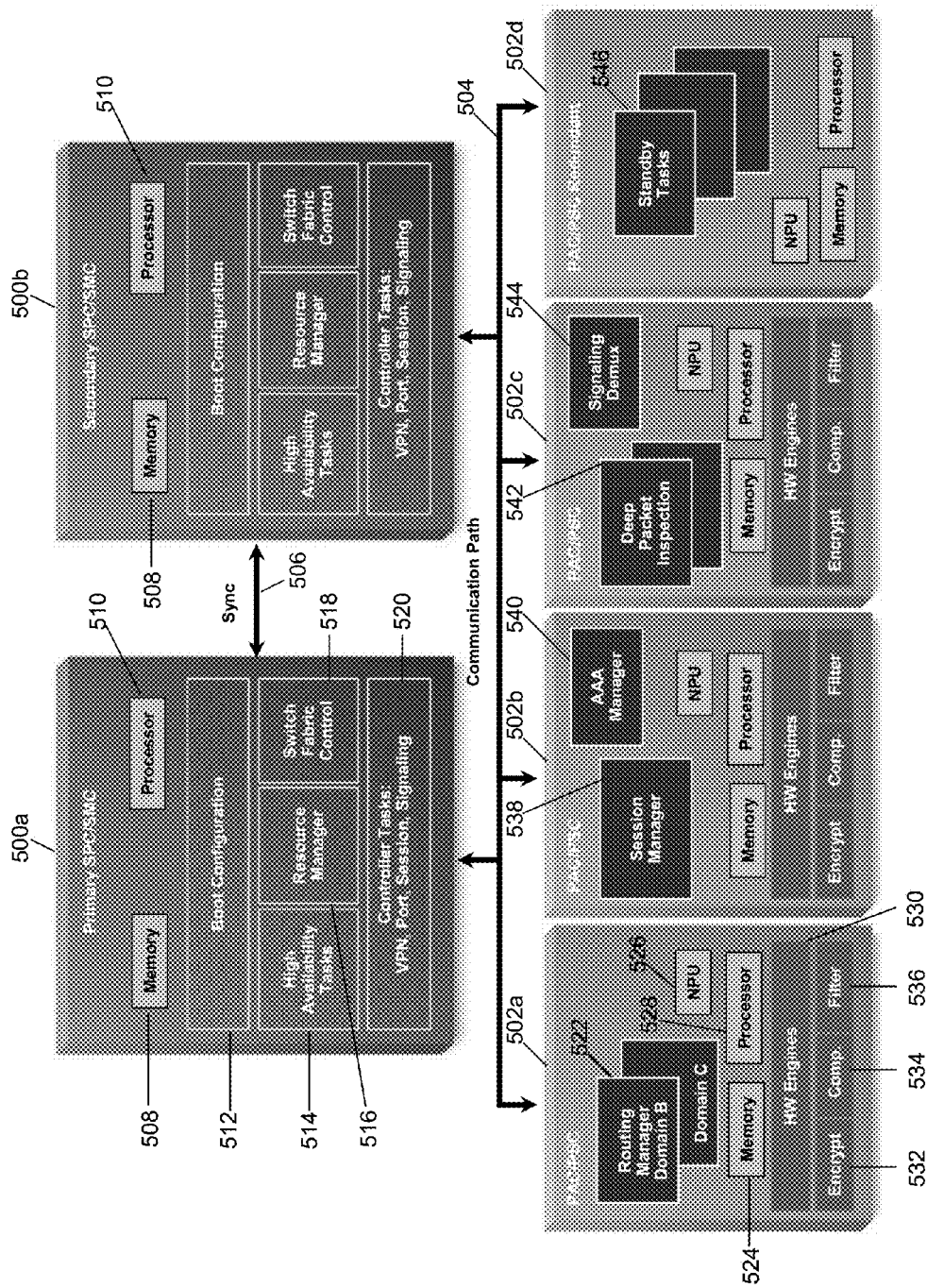
FIG. 10 illustrates a logical view of the software architecture of a network device in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 10 illustrates a logical view of the software architecture of a network device in accordance with certain embodiments. As shown, the software and hardware can be distributed within the network device and across different circuit boards, processors, and memory. FIG. 10 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502*d* provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. A method comprising:
   establishing a first control connection between a home node and a home node gateway having a first control connection identity;
   establishing a second control connection between the home node gateway and a mobility management device having a second control connection identity;
   communicating network traffic sent between the home node and the mobility management device on behalf of a mobile device using the first control connection and the second control connection;
   receiving a mobile device identifier included in a control message sent from the mobility management device using the second control connection in response to an entity type indication sent to the mobility management device from the home node gateway, the mobile device identifier substantially uniquely identifying the mobile device;
   correlating the mobile device identifier with a context including the first control connection identity and the second control connection identity; and
   correlating the context with a plurality of existing contexts previously correlated with the same mobile device identifier.

2. The method of claim 1, wherein the plurality of existing contexts previously correlated with the same mobile device identifier were so correlated during a network procedure performed prior to the mobile device transitioning from an active mode to an idle mode.

3. The method of claim 2, wherein the network procedure is an initial attach procedure.

4. The method of claim 2, further comprising performing operations, administrations and management functions based on the correlations.

5. The method of claim 4, wherein the operations, administration and management functions comprise generating a report which details all of a plurality of mobile devices for which the home node gateway communicated traffic.

6. The method of claim 4, wherein the operations, administration and management functions comprise refusal to communicate network traffic on behalf of the mobile device based on the mobile device identifier of that mobile device.

7. The method of claim 4, wherein the first control connection and the second control connection are established using the S1 Application Protocol, the first control connection identity and the second control connection identity are comprised of S1 Application Protocol Identifiers and the mobile device identifier is an International Mobile Subscriber Identity (IMSI).

8. The method of claim 1, further comprising receiving an updated mobile device identifier and correlating the updated mobile device identifier with the context, wherein the context includes connection state information.

9. The method of claim 8, wherein the updated mobile device identifier is a Globally Unique Temporary Identity (GUTI).

10. The method of claim 1, wherein the communicated network traffic sent between the home node and the mobility management device on behalf of the mobile device comprises a network handover procedure.

11. The method of claim 1, wherein the home node gateway is a home evolved node B gateway.

12. The method of claim 1, further comprising removing the mobile device identifier included in the control message before forwarding that control message to a home node for delivery to the identified mobile device.

13. A home node gateway comprising:
    an interface that is configured to provide communication with other network devices; and
    a processor that is configured to establish a first control connection with a home node, establish a second control connection with a mobility management device, communicate network traffic between the home node and the mobility management device on behalf of a mobile device using both the first control connection and the second control connection, receive from the mobility management device a mobile device identifier which substantially uniquely identifies the mobile device in response to an entity type indication sent from the home node gateway to the mobility management device, establish a correlation between the mobile device identifier and a context including a first control connection identity and a second control connection identity, and correlate the context with a plurality of existing contexts previously correlated with the same mobile device identifier.

14. The home node gateway of claim 13, wherein the plurality of existing contexts previously correlated with the same mobile device identifier were so correlated during a network procedure performed prior to the mobile device transitioning from an active mode to an idle mode.

15. The home node gateway of claim 14, wherein the processor is configured to perform operations, administrations and management functions based on the correlation.

16. The home node gateway of claim 15, wherein the first control connection and the second control connection are established using the S1 Application Protocol, the first control connection identity and the second control connection identity are comprised of S1 Application Protocol Identifiers and the mobile device identifier is an International Mobile Subscriber Identity (IMSI).

17. Software encoded on one or more non-transitory computer-readable media and when executed operable to:
    establish a first control connection between a home node and a home node gateway having a first control connection identity;
    establish a second control connection between the home node gateway and a mobility management device having a second control connection identity;
    communicate network traffic sent between the home node and the mobility management device on behalf of a mobile device using the first control connection and the second control connection;
    receive a mobile device identifier included in a control message sent from the mobility management device using the second control connection in response to an entity type indication sent to the mobility management device from the home node gateway, the mobile device identifier substantially uniquely identifying the mobile device;

correlate the mobile device identifier with a context including the first control connection identity and the second control connection identity; and correlate the context with a plurality of existing contexts previously correlated with the same mobile device identifier.

* * * * *